Nov. 4, 1952

B. AMES 2,617,008

ELECTRICALLY ENERGIZED COOKER

Filed May 31, 1946

Inventor
Butler Ames
by Roberts Cushman Grover
Att'ys.

Inventor
Butler Ames

Nov. 4, 1952 B. AMES 2,617,008
ELECTRICALLY ENERGIZED COOKER
Filed May 31, 1946 5 Sheets-Sheet 4

Nov. 4, 1952 B. AMES 2,617,008
ELECTRICALLY ENERGIZED COOKER
Filed May 31, 1946 5 Sheets-Sheet 5

Inventor
Butler Ames
by
att'ys.

Patented Nov. 4, 1952

2,617,008

UNITED STATES PATENT OFFICE 2,617,008

ELECTRICALLY ENERGIZED COOKER

Butler Ames, Boston, Mass.

Application May 31, 1946, Serial No. 673,267

5 Claims. (Cl. 219—35)

This invention pertains to electrically energized superheated steam cookers, and relates to improvements in cookers of the general type disclosed in my prior patents—Nos. 2,224,945 and 2,300,837, dated December 17, 1940 and November 3, 1942, respectively. In common with the cookers disclosed in said patents, this improved cooker is particularly designed for connection into an ordinary residential lighting circuit so that special wiring for its installation is unnecessary, but with its controls so designed that it is not possible to place an overload on the wiring or meter. However, many of the novel details herein disclosed are useful in larger units and where heavier current and voltage are available.

Among the objects of the present invention are to provide a cooker having a top or exterior heating unit, which may be used in the same ways as the top heating unit of a conventional electric range, as well as to provide an oven having upper and lower heating units, one at the bottom of the oven and the other at the top, the latter being so devised as to emit radiations which are effective to change or destroy odors or smoke evolved in the oven. A further object is to provide a cooker of simple construction and small exterior dimensions although amply large for ordinary family use, and wherein the oven is adequately insulated so as to conserve the heat supplied to it. A further object is to provide a cooker wherein the control switches and wiring are normally concealed and protected, although easily accessible for inspection or repair. A further object is to provide a cooker comprising a minimum number of parts but which is strong and rigid although light in weight; easily portable; and quick to heat and cool. A further object is to provide a cooker having a heat-insulated oven door which swings down to a substantially horizontal position with its inner face substantially flush with the oven floor when open, and having simple and effective means for supporting the oven door in the open position. A further object is to provide a cooker having a top unit and oven units which are readily removable from the cooker simply by partially rotating them and which have contact elements which engage or disengage complemental fixed contact elements carried by the cooker structure as the units are turned in one direction or the other, respectively. A further object is to provide a cooker whose heating units are interchangeable and of improved and highly effective type, and to provide an improved heating unit capable of emitting radiations which are effective for cooking as well as for destroying or changing odors and smoke resultant from the cooking and self-cleaning operations. Other and further objects and advantages of the invention will be pointed out in the following more detailed description and by reference to the accompanying drawings, wherein.

My prior patents disclose the cooking or steaming of vegetables not immersed in water, but merely with the aid of a small amount thereof, and describe the use of a cooker having a fairly thick walled aluminum oven. This thickness and material served to conduct heat from a heating unit at the top to the bottom of the oven as well as to reflect but not to absorb the photons (light) and other radiations. In this way I obtained heat for vaporizing the water in the bottom of the receptacle holding the vegetables. The food had to be protected from the intense radiations coming from the heating element in the upper part of the oven.

Referring to the drawings, the improved cooker is shown as comprising an outer shell or housing H (Fig. 1) which comprises the rear frame 1 and the front frame 2. Each of these frames is of substantially rectangular shape (but with smoothly rounded corners) and is of stiff, thin-walled metallic tubing, for example, stainless steel tubing. The frame 1 supports a rear panel 3 of sheet material, for instance stainless steel, having its margins curled to embrace the top, bottom and side members of the frame 1. A front panel 4 (Fig. 1) of similar material, is similarly associated with the front frame 2, but this front panel 4 is cut away to provide the door opening.

Figure 9:
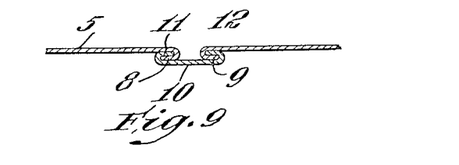
Fig. 9 is a fragmentary section substantially on the line 9—9 of Fig. 2, showing the way in which the front-to-rear edges of the shell or housing are united.

The top, sides and bottom walls of the outer casing or housing H preferably consist of portions of a single length 5 of sheet metal, for instance stainless steel, having its front and rear margins curved as shown at 6 and 7 (Fig. 1) so as partially to embrace the curled margins of the panels 3 and 4 where said margins embrace the frames 1 and 2, the strip 5 being bent to follow the curved corners of the front and rear frames. The front-to-rear margins of the strip 5 are located at the under side of the housing and are bent to provide the oppositely directed spaced lips 8 and 9 (Fig. 9). The space between said lips is located on a line connecting the axes of the front and rear legs at one side of the cooker. A channel strip 10, having oppositely directed flanges 11 and 12, is interlocked with the lips 8 and 9. The length of the strip 5 is such that when the strip 10 is in place, the strip 5 is held under tension with its margins 6 and 7 firmly engaging the front and rear frames, thus providing a rigid structure. However, merely by withdrawing the channel strip 10 endwise, in a front-to-rear direction the strip 5 is released and may readily be disengaged from the front and rear frames so as to expose the interior structure of the cooker. Since the channel strip is in a line connecting the front and rear legs, it is locked in place when both legs are in operative position, and can only be withdrawn after one or the other leg has been removed.

That part 5a of the strip 5 which constitutes the top wall of the housing is provided with a central aperture for the reception of the top heating unit hereinafter described, while that part of the strip 5 which constitutes the right-hand wall of the housing is furnished with openings (Fig. 2) giving access to the control switches 14 and 15 and to the corresponding plug receptacles 16 and 17, the switches and receptacles being mounted on the casing C. The part of the strip 5 which forms the bottom wall of the housing has an aperture for the lower oven-heating unit.

The housing has a supporting leg at each corner. Preferably each leg comprises a solid cylindrical upper part 18 (Figs. 2 and 3) having an integral screw-threaded stud 19 at its upper end which is received in a corresponding screw-threaded socket in the lower member of the corresponding frame of the housing. To provide a firm connection between the leg and the frame, the latter is preferably provided with a solid filler plug 20 in which the screw thread is formed, each filler plug being fixed within the tubular frame member, for instance by welding. As herein illustrated, each leg also comprises a lower sleeve portion 21 into which the upper part 18 telescopes. Preferably the parts 18 and 21 have screw-threaded engagement with each other so that by turning the part 21 relatively to the part 18 the effective length of the leg may be varied so as to provide for leveling the cooker. The lower part 21 of the leg is preferably of a material which is a good electrical and heat insulator, for example a synthetic resin, or if the part 21 be of metal, it may be provided with a non-metallic insulating cushion 22. The legs are of a length such as to elevate the lower wall of the housing substantially above the surface of the support, for instance a table top on which the cooker is mounted, thereby to space the lower heating unit a safe distance from said surface to prevent damage, and at the same time providing convenient space beneath the cooker for the storage and warming of utensils.

Adjacent to each of its four corners the rear panel 3 has a forwardly directed hollow boss 23 (Fig. 10) provided with an opening which receives the reduced rear end portion of a spacer sleeve 24 whose rear end is headed over at 25 or welded to the panel 3 so as rigidly to secure the sleeve to the panel.

The rear wall 26 of the hollow sheet metal intermediate shell or casing C bears against the forward ends of the spacer sleeves 24 and is thereby held away from the panel 3 so as to provide an intervening air space or chamber 27. This casing C also comprises a top wall 28, a bottom wall 29 and side walls 30. The top, side and bottom walls are preferably formed from a single strip of sheet material, for example sheet metal coated with aluminum. The rear margin of this strip is bent to form a flange 31 (Fig. 1) which overlaps the edges of the rear wall 26 and which is secured to the latter, for instance by welding. The forward edges of the walls 28, 29 and 30 contact and are positioned and supported by the front panel 4 of the outer housing. The front-to-rear edges of the strip which forms the top, bottom and side walls of the casing C are butted or lapped and welded, thus providing a strong and stiff shell.

The top wall 28 of this casing C is provided with a central aperture coaxial with the aperture in the top wall of the housing H, the material which borders this aperture in the top wall 28 of the casing forming a downwardly directed annular flange 32. The bottom wall 29 of the casing is likewise provided with a central aperture, coaxial with the aperture in the top wall and also designed to receive a heating unit, this latter aperture being bounded by an upturned annular flange 33.

An annular support or sleeve 34 is arranged within the aperture in the top wall 28 of the casing and carries the fixed electrical contacts which supply current to the top heating unit and the upper oven unit. This sleeve is of sheet material and comprises a cylindrical portion 35 which fits snugly within the flange 32 of the casing C. The sleeve also comprises a substantially horizontal shoulder 36 which rests upon the upper surface of the top wall 28, and a cylindrical portion 37 which extends up through the aperture in the top wall of the housing H, said latter aperture being bounded by the upstanding annular flange 38 which fits snugly about the flange 37.

A similar supporting and positioning sleeve or annulus 39 is arranged in the aperture in the bottom wall 29 of the casing, and carries the fixed electrical contacts which supply the lower oven-heating unit. This latter sleeve comprises the cylindrical portion 40 (Fig. 1) which fits snugly within the flange 33; the horizontal shoulder portion 41 which seats against the lower surface of the bottom wall 29, and the downwardly directed cylindrical portion 42 which fits snugly within an upturned annular flange 43 bordering the aperture in the bottom wall of the housing. The sleeve 39 may be secured to the bottom wall 29 of the casing in any desirable way, for example by welding. When the sleeves 34 and 39 are in place they lock the several shells together, thereby greatly increasing the stiffness and rigidity of the structure.

The oven O is arranged within the casing C. This oven comprises a rear wall 44 (Fig. 1), a top wall 45, a bottom wall 46, and side walls 47. The dimensions of the oven O and casing C are such that the oven may be pushed in through the open front end of the casing after the latter has been assembled with and secured in place in the housing. The rear wall of the oven bears against the forward ends of spacer sleeves 48 coaxial with the sleeves 24 above described. Bolts 49 pass through openings in the walls 44 and 26 and through the sleeves 48 and 24, and have nuts 50 (Fig. 11) at their rear ends whereby the oven, casing and rear panel of the housing may be rigidly connected.

The top, side and bottom walls of the oven are preferably formed from a single strip of sheet metal, for example, stainless steel. The rear margins of this strip are bent to form flanges 51 which overlap the edges of the rear wall 44 of the oven, to which they are secured, for example by welding. The forward margin of this strip of metal is bent upwardly to form the stiffening flange 52 (Fig. 1) which bears against the forward face of the front panel 4 when the parts are assembled, this flange 52 also constituting a stop for the oven door.

The top wall 45 of the oven is provided with a central aperture (coaxial with that in the casing wall 28) and bounded by the downturned annular flange 53 (Fig. 1) which terminates flush with the lower edge of the sleeve member 35. The bottom wall 46 of the oven is provided with a central aperture (coaxial with the aperture in the casing wall 29), the material bordering this aperture in the bottom wall 46 of the oven, resting upon the upper edges of the flanges 33 and 40. The oven is well insulated from other parts of the cooker, since the area of actual contact with the other parts is very small. The oven is provided with a plurality of guides S of angle bar stock on which racks may be supported.

In connection with the use of the cooker as an oven, or boiler or roaster, or for frying purposes, there are two racks which fit the guides S on the sides of the oven. One may be of a dense metal of high reflecting surfaces or of sheet steel or metal coated with aluminum on both sides, without any openings in it, fitting fairly closely to the side, front and back of the oven itself. This rack has its outside edge folded up a short distance to hold any spilling of grease or water thereon. The other rack is made of wire mesh preferably of polished stainless steel, or punched metal, aluminum coated or of highly reflecting surfacing, to be used as a filter for the radiation coming from the heating element in the top of the oven, and modifying the same as convenience requires, depending upon the position with reference to the heating element.

Figure 8:
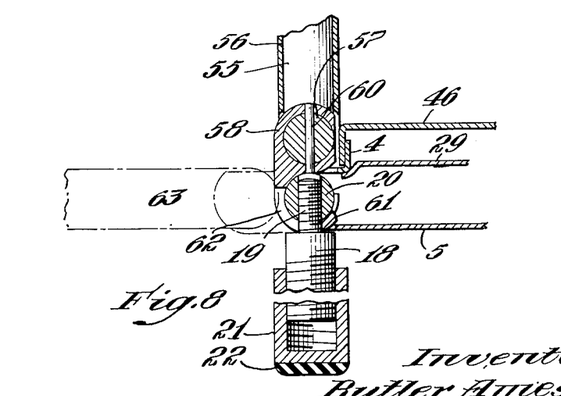
Fig. 8 is a fragmentary section, to large scale, substantially on the line 8—8 of Fig. 3.

The oven door 54 (Figs. 1, 2 and 8) comprises a rectangular frame formed from stiff thin-walled metal tubing 55, for example stainless steel, which supports spaced front and rear panels 56 and 57 of sheet metal, for example of stainless steel.

Hinge members 58 and 59 (Fig. 3) are secured for example by pins 60 (Fig. 8) to the lower member of the tubular door frame, each hinge having a hook portion 61 which partially embraces the lower member of the front frame 2 of the housing. Each hinge member 58 and 59 is of substantial transverse width and the hook portion 61 of each flange has an opening 62 through which passes the screw-threaded stud 19 of one of the front legs, respectively. The openings 62 terminate at 63 and when the oven door is swung down to the horizontal position, as shown in broken lines in Fig. 8, the upper ends 63 of the openings engage the corresponding studs 19 thus limiting downward movement of the door. The arrangement of the studs within the openings 62 constitutes an effective means for securing the door to the housing, but if it be desired to remove the door from the cooker, it is merely necessary to unscrew the front legs so as to withdraw the studs 19 from the openings in the door hinge whereupon the hinges may readily be unhooked from the frame 4.

The door is provided with a handle 64 and with suitable latch means for holding the door closed. In accordance with a preferred construction, the handle 64 is carried by a rotatable spindle 65 journaled in the door and provided, within the thickness of the door, with crank members 66 or equivalent devices, for actuating oppositely directed locking bars or latch members 67 whose outer ends are designed to engage recesses (not shown) in the front panel of the housing. With this arrangement, it is possible to obtain a substantially air-tight joint between the closed door and the door stop 52. However, any other suitable type of locking means may be employed.

Figure 4:
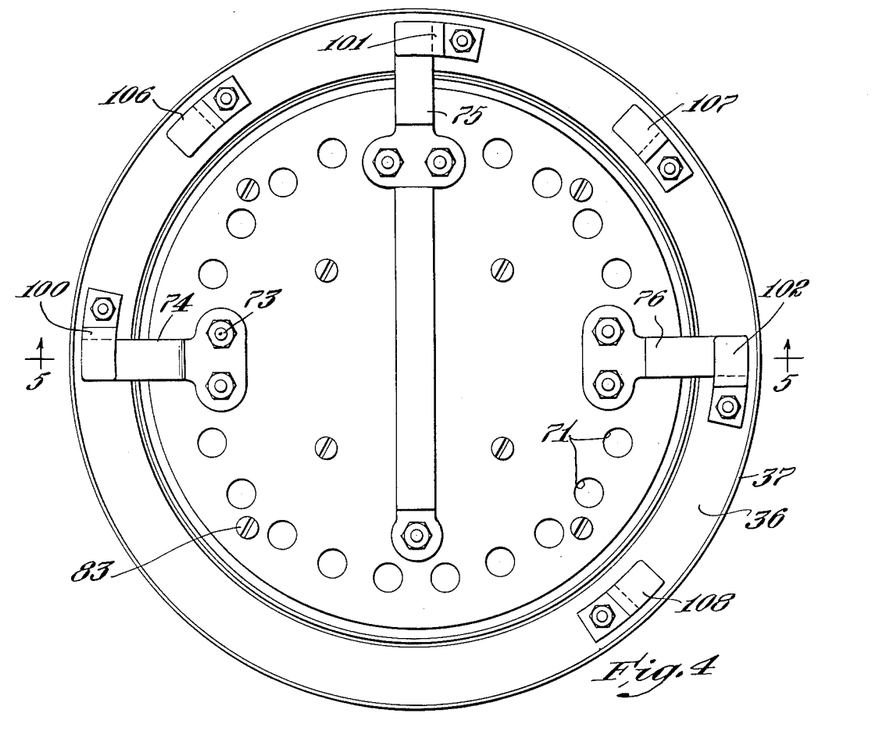
Fig. 4 is a plan view, to larger scale, of one of the heating units and the supporting sleeve in which it is mounted.
Figure 5:
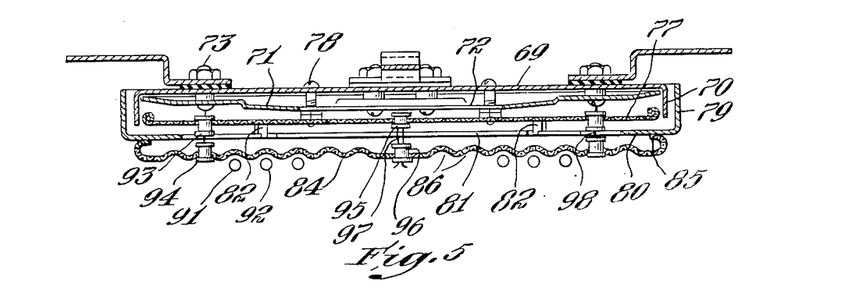
Fig. 5 is a diametric section showing one of the heating units (removed from its supporting sleeve) substantially on the line 5—5 of Fig. 4.
Figure 6:
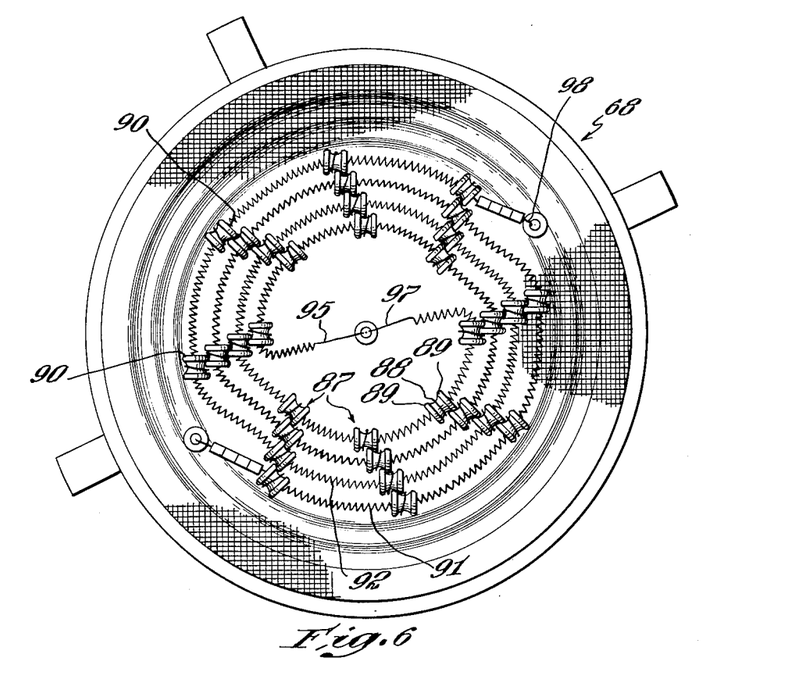
Fig. 6 is a bottom view of one of the heating units, showing the arrangement of the resistance coils and the supports for the coils.
Figure 7:
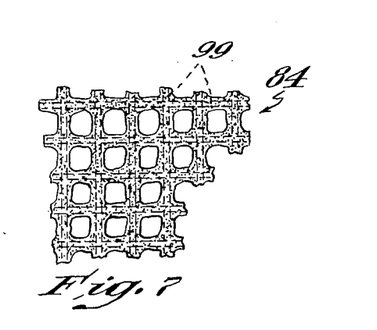
Fig. 7 is a fragmentary plan view, to large scale, illustrating the character of the screen which forms a support for the resistance coils.

An improved and preferred heating unit employed in the cooker of the present invention is illustrated in Figs 5, 6 and 7. This unit (as illustrated in Fig. 5) has an outer protective casing comprising two shallow opposed cups, one telescoped within the other. As illustrated in Fig. 5, the inner or upper cup is inverted, having its bottom 69 uppermost and having the cylindrical side wall 70. The bottom 69 has a plurality of apertures 71 (Fig. 4) shown as disposed at the same distance from the center of the cup. Within the upper cup and held in spaced relation to its bottom 69 is a reflector plate 71 of bright aluminum. This plate is downwardly convex, as shown in Fig. 5, with its edge slightly spaced from the bottom of the cup and having a central aperture 72. The marginal portion of this reflector plate 71 is held in spaced relation to the cup bottom 69 by means of bolts 73 passing through apertures in the plate and the bottom 69 of the cup, refractory insulating washers being interposed between the cup and plate.

Insulated contact blades 74, 75 and 76 are fixedly secured to the upper surface of the cup bottom 69 by the bolts 73. These contact blades, as shown in Fig. 4, are or may be located 90° apart. A protective disk 77 of wire mesh screen is arranged substantially in the plane of the lower edge of the wall 70 of the upper cup, and is held in spaced relation to the reflector 71 by studs 78 fixed to the cup bottom 69. The screen disk 77 protects the reflector plate 71 from melting, and also acts to reflect radiation back toward the heating elements, while the plate reflects back the radiations which pass through the screen. The heated gases and vapors pass up around the circumference, and then over the heated surface of this aluminum plate 71, and in close contact therewith, which is smaller in diameter than the cup in which it is held, and then pass out through the holes 71 in the cup bottom.

The outer or lower cup which forms the lower part of the casing of the heating unit is of larger diameter than the upper cup and is arranged in concentric relation to the latter with the cylindrical wall 79 of the lower cup surrounding but spaced from the wall 70 of the upper cup and with the bottom 80 of the lower cup spaced from the disk 77. The bottom 80 of the lower cup has a large central aperture 81, the margin of this aperture having upturned tabs 82 which engage the lower side of the disk 77, as shown in Fig. 5, thereby to hold the disk 77 in contact with the studs 78. Bolts 83 (Fig. 4) pass through aligned openings in the bottoms 79 and 80 of the two cups, and hold the cups in assembled relation.

A wire mesh disk 84 is arranged below and parallel to the bottom 80 of the lower cup. This disk 84 has an upturned flange 85 at its edge which bears against the under surface of the cup bottom 80, and is preferably provided with concentric annular corrugations providing a series of concentric grooves 86 in its lower surface. While these grooves are here shown as concentric, it is within the purview of the invention to provide a single spiral groove instead of the series of concentric grooves.

Within these grooves there are disposed a plurality of insulating grommets or spool-like sleeves 87 (Figs. 5 and 6) of refractory, electrical insulating material, for example, porcelain, each grommet having a central barrel portion 88 (Fig. 6) and end portions 89 of larger diameter than the barrel. These grommets are tubular and arranged with their axes parallel to the plane of the disk 84, and with their peripheral surfaces contacting the walls of the grooves 86. These grommets or sleeves are attached to the screen disk 84 by tie wires 90 preferably of stainless steel, which are wrapped around the barrels of the grommets and which pass up through the meshes of the screen and have their ends united above the screen. The grommets constitute insulating supports for the resistance coils 91 and 92, which may be of any of the usual materials employed for this purpose. Not only do the corrugations in the screen disk 84 provide cradles for the grommets, but they also serve to spread the radiations from the heating elements throughout the oven.

As illustrated in Fig. 6, the grommets which support the coils 91 and 92, are arranged in a spiral series, the turns of one spiral series being interposed between those of the other. The grommets are preferably arranged in groups, as shown in Fig. 6, so as to expose unobstructed arcs of the resistance coils of as great a length as is consistent with adequate support.

One end 93 (Fig. 5) of the coil 91 is passed through a refractory insulating sleeve 94 set in the screen 84 and through a refractory sleeve in the screen 77 and is then attached to one of the bolts 73 which anchors the contact blade 74 to the cup bottom 69. The opposite end 95 of coil 91 passes through an insulating sleeve 96 at the center of the screen disk 84 and through a second insulating sleeve in the screen 77 and is electrically connected to contact blade 75. The inner end 97 of coil 92 is likewise connected to contact blade 75, while its opposite end 98 passes through insulating sleeves in the screens 77 and 84 and is electrically connected to the contact blade 76.

The screen disk 84 and the insulating grommets 87 (after the latter have been attached to the screen disk) are coated, for example, by spraying or dipping, with a refractory cement 99 such as Alundum (Fig. 7). The screen is then baked to harden the cement. This coating covers the grommets and the constituent wires of the screen, but does not completely close the openings in the screen, as shown in Fig. 7. Through these openings in this screen, and close to the heating elements, must pass all the airborne products of cooking, whether the door of the cooker is closed or open, and are so brought in close proximity to the radiations that destroy or change them. The screen disk 77 is preferably coated in the same manner with a refractory cement.

The horizontal shoulder 36 of the sleeve which, as above described, fits within the central opening in the top wall of the casing C, forms a support (Fig. 4) for fixed somewhat resilient contact blades 100, 101 and 102, spaced apart 90° and which are designed to be engaged by the blades 74, 75 and 76, respectively, of the heater unit 68, the blades of the heater unit being electrically contacted with the fixed blades by a partial rotation of the heater unit relatively to the sleeve.

Figures 1, 10:
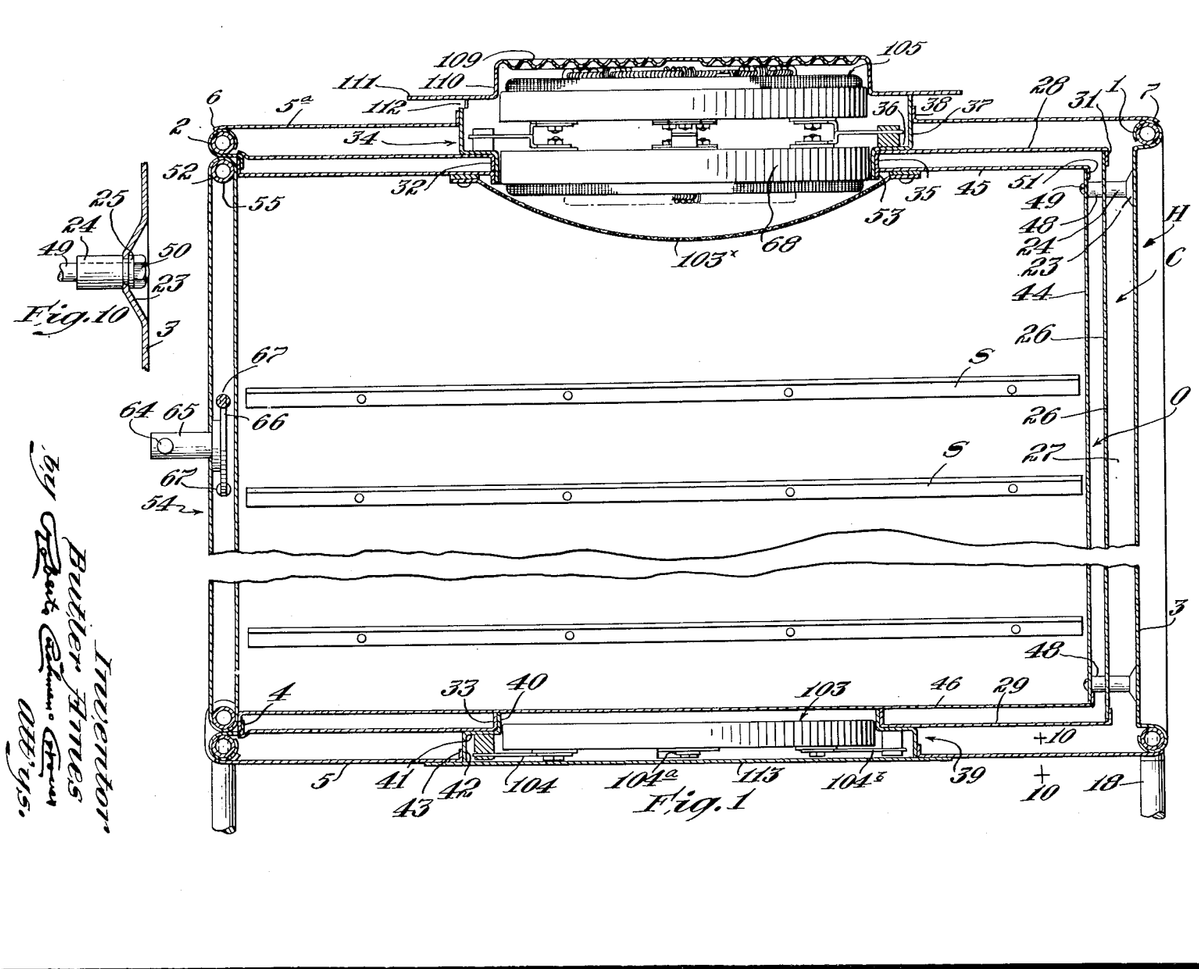
Fig. 1 is a vertical front-to-rear section (with certain parts broken away) through the axes of the heating units.
Fig. 10 is a fragmentary vertical section showing a detail of construction.

As shown in Fig. 1, the upper oven unit 68, when in operative position, is located with the heating coils 91 and 92 at the under side of the unit. As thus arranged the heating coils might be subject to mechanical injury and to avoid such possibility a guard screen $103^x$ (Fig. 1) is disposed within the oven just below the unit 68. This screen is of heavy wire mesh, preferably of stainless steel and preferably coated with refractory cement like the screens 84 and 77, and is downwardly convex and is electrically insulated from the top wall 45 of the oven, the screen being secured to the wall 45 by screws or the like.

This heating element, which throws radiant heat into the oven and furnishes the radiations to destroy and change odors, smoke, and products of cooking, is completely protected by a metal screen below it.

The insulation of the screen $103^x$ is necessary to prevent the radiations from the heating element which it protects from forming an easy and short return through the material of the cooker itself back to the energy source furnished by the heating element.

The space between the heating element and this protective screen $103^x$ due to the radiations from the heating element and background reflector, and the materials thereon, is relatively highly ionized, and unless this protecting screen were insulated there would be a great reduction in the radiating heat going into the lower part of the cooker. It is in this space and its near neighborhood that the radiations furnished by the electrons, the neutrons and the protons or the alpha, beta, photons and possibly gamma rays, serve to break up and change odors, smoke, or other fumes brought about in the cooking. All this is done in the presence of highly heated and expanded water vapor made possible by the radiations from the heating element. It is near here that carbon from burning grease or fats, in combination with superheated water vapor from moisture always present in the food that is being cooked, recombine to make this an odorless cooker.

The lower oven unit 103 (Fig. 1) is substantially like the unit 68 but is inverted so that its heating coils are disposed at the top, and, lying so close to the under side of the inner casing, are very efficient in heating the metal above it. The contact blades of this unit are like the blades 74, 75 and 76, above described, and are designed to engage (by partial rotation of the unit) with fixed contact blades 104, 104ª and 104ᵇ, supported by the horizontal shoulder 41 of the sleeve which fits within the central aperture in the bottom wall 29 of the casing.

The top or exterior heating unit 105 (Fig. 1) is substantially identical with the unit 68, and is arranged like the bottom oven unit with its heating coils at the top and is very efficient in heating the lid and anything placed thereon. The contact blades of this top unit are like those of the unit 68 and are designed for electrical engagement with a second set (Fig. 4) of fixed somewhat resilient contact blades 106, 107 and 108, mounted on the horizontal shoulder 36 of the supporting sleeve, the fixed contacts 106, 107 and 108 being arranged 90° apart and being spaced substantially 45° from the fixed contact 74, 75 and 76, respectively.

The top unit 105 (Fig. 1) is provided with a cast iron lid, or if preferred with a protective casing of sheet metal, preferably of stainless steel, comprising a top member 109 preferably consititutes a support upon which cooking utensils may be placed. The corrugations of the top provided with concentric corrugations and which member 109 allow for high variation in heat without danger of warping. This lid or protective casing also comprises a cylindrical side wall 110 and an outwardly directed horizontal flange 111, the latter being designed to rest upon the upper edge of the cylindrical part 37 of the supporting sleeve. The upper edge of this sleeve has a plurality of recesses or notches 112 (Fig. 3) which provide escape ports for gaseous products emitted during the cooking operation. The heating unit 105 is secured within its protective casing, for example by rivets or attaching bolts, and with its protective casing constitutes a removable stove lid. By turning this lid so as to disengage the contact blades of the unit 105 from the fixed contacts 106, 107 and 108, the lid is free to be removed from the cooker, thus exposing the upper oven unit 68 which may likewise be removed through the opening left by lifting the lid. A plate 113 (Fig. 1) normally underlies the lower oven unit 103 being attached to the margin of the bottom wall of the housing by screws or bolts. After removing the plate 113, the lower oven unit 103 may readily be withdrawn downwardly from the cooker.

The coils 91 and 92 of the heating unit are of the same heating capacity. For example, if both coils be energized in series the unit provides low heat. If either coil alone be energized the unit emits medium heat, and if both coils be energized in parallel the unit emits high or maximum heat.

Figure 2:
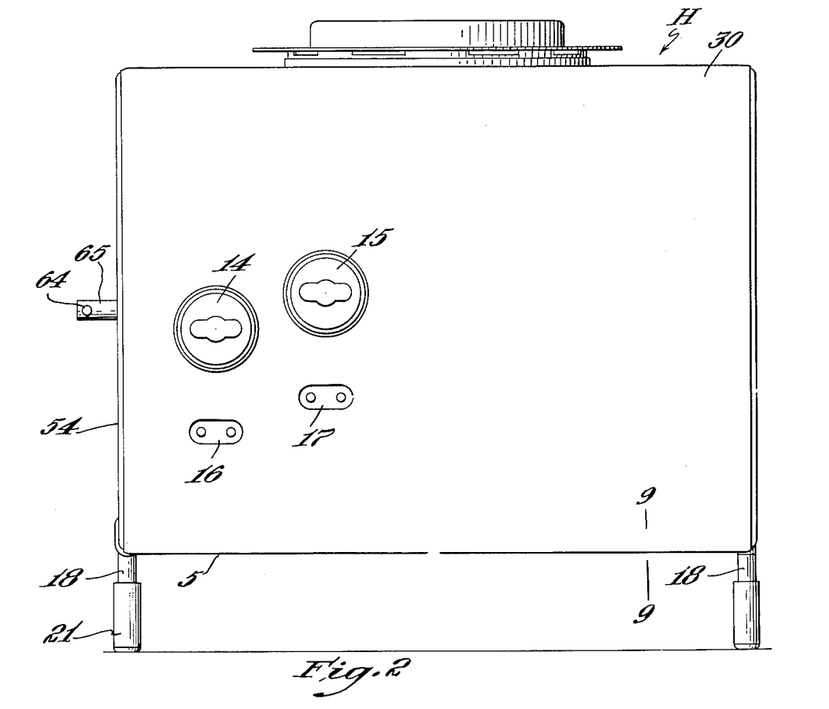
Fig. 2 is a side elevation, to somewhat smaller scale, showing the right-hand side of the cooker.
Figure 3:
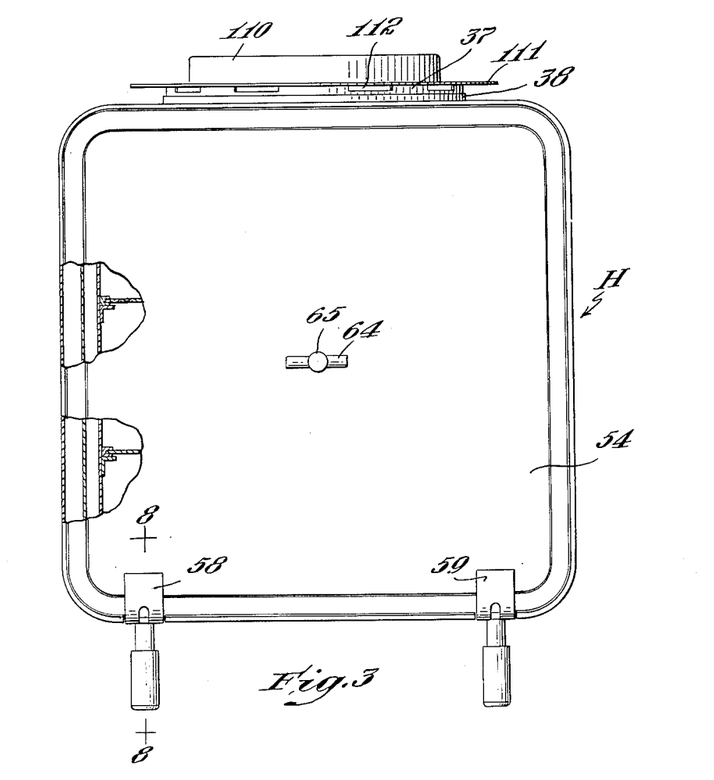
Fig. 3 is a front elevation, with parts in section, of the cooker with the oven door closed.

The fixed contacts 106, 107 and 108 which supply current to the top heating unit 105 are connected by appropriate wiring (not shown) passing over the outer surface of the casing, and located in the space 27 between the casing and housing, to the terminals of the control switch 14 (Fig. 2). This switch may be a conventional switch designed to supply current to one or both coils and receives current from the plug socket 16. By inserting a supply plug in the socket 16 and manipulating the switch 14, one or both of the coils 91 and 92 of the top unit 105 may be energized in such a way as to provide any of three degrees of heat for cooking on top of the cooker. However, when the plug is inserted in the socket 16 no current is furnished to the coils of either of the oven units 68 or 103.

The control switch 15 (Fig. 2), of conventional type, is connected to the fixed contacts which supply the upper and lower oven units, by conductors (not shown) which pass over the outside of the casing and between the latter and the outer housing. When the supply plug is inserted in the socket 17, current is supplied to the switch 15 but not to the switch 14. When the switch 15 is turned to maximum heat, current passes to the contact blades 74 and 76, thence in parallel through coils 91 and 92 and through blade 75 back to the switch, thus heating the oven unit to high heat, but with this setting of the switch no current is supplied to the lower oven unit 103.

When the switch 15 is turned to medium heat, current flows from the switch to the fixed contact blade 74 of the upper oven unit, and likewise to the fixed contact blade 104 of the lower oven unit, thence in parallel through the coils 91 of the two oven units and back to the switch, but no current is supplied to the coil 92 of either unit. When the switch 17 is turned to low, current is supplied to the fixed blade 74 of the upper oven unit and to the fixed blade 104 of the lower oven unit, and flows in series through both heating coils 91 and 92 of each unit, thence returning to the switch terminal 119. Instead of two separate plug sockets, a single socket may be provided with an appropriate primary switch designed to supply current to one or the other of the control switches 14 or 15.

It is thus possible to use the top heating unit of the cooker in substantially the same way as the top unit of a conventional electric range with provision for at least three heats, and enabling any usual sort of cooking to be carried out on the top of the cooker. The coils 91 and 92 are so designed that when both are in use simultaneously, no more current is consumed than constitutes a safe load for the ordinary house light circuit. Since neither of the oven units may be supplied with current when the top unit is in use, this safe load can not be exceeded.

Likewise since the bottom unit can not be used when the top oven unit is set for high heat, the use of the oven can not be such as to cause overload. The maximum current which can be used at one time is that which flows when both upper and lower oven units are set for medium heat and the coils are so designed that at this setting the safe load can not be exceeded. With a total resistance in the heating elements, which are in use at any one time, allowing the use of some 1250 amp.—the maximum allowed in the ordinary house wiring—there is no danger of blowing the ordinary house fuses or ruining the wiring. Thus the cooker of the present invention may safely be used by plugging it in to the ordinary house light circuit, and may be used either for open cooking on the top of the cooker or for cooking in the oven, and while using either the upper oven unit alone or both oven units. Obviously, if desired, and when heavier current is available, the cooker might be designed to have a plurality of the heating units arranged in multiple so as to provide greater cooking capacity.

While one desirable embodiment of the invention has herein been illustrated and described by way of example, it is to be understood that the invention is broadly inclusive of any and all modifications falling within the scope of the appended claims.

I claim:

1. An electric cooker comprising an oven, a casing for the oven, and an outer housing, means holding the oven, casing and housing in spaced and locked-together nested relation, the oven being open at its front, the housing comprising rigid tubular front and rear frames, legs secured to the front and rear frames, and a door hinged to the front frame for closing the front of the oven, the legs secured to the front frame being constructed and arranged to constitute supports for holding the door in substantially horizontal position when open, with its inner surface on substantially the same level as the bottom of the oven.

2. An electric cooker comprising an oven, a casing and a housing, and means holding them in spaced relation with the oven inside of the casing and the casing inside of the housing, the cooker having top and bottom walls each having an opening, said openings being in registry, an annulus coaxial with each of said openings, each annulus having a shoulder which rests upon the casing, a plurality of fixed contact blades carried by each annulus, each annulus having an aperture in its peripheral wall for the passage of a conductor, a switch block mounted on the side wall of the casing, and conductors interposed between the housing and casing and extending from the switch block to said fixed contact blades.

3. An electric cooker comprising an oven, a casing and a housing, and means holding them in spaced relation with the oven inside of the casing and the casing inside of the housing, the cooker having top and bottom walls each provided with an aperture, an annulus coaxial with each opening in the cooker walls, each annulus having a radial shoulder which contacts the casing, each annulus being of an axial depth such as to reach from the outer surface of the housing to the inner surface of the oven, and fixed contact blades mounted on the shoulder of each annulus.

4. An electrical cooker having an oven provided with a top wall, said wall having therein an aperture, an annulus fitting within the aperture and having a substantially horizontal shoulder, fixed electrical contact blades mounted on said shoulder, a removable heating unit which seats on the shoulder and which has contact blades engageable with said fixed contact blades, and means for covering said aperture, the upper edge of the annulus having recesses providing egress ports beneath said covering means.

5. An electrical cooker having an oven provided with a top wall, said wall having therein an aperture, an annulus fitting within the aperture and having a substantially horizontal internal shoulder, fixed electrical contact elements mounted on the shoulder, a removable lid designed to rest upon the top of the cooker and to cover the aforesaid aperture, a heating unit housed within said lid, and a second set of fixed contacts mounted on said shoulder of the annulus and designed to engage corresponding contacts carried by the heating unit housed within the lid.

BUTLER AMES.

REFERENCES CITED

The following references are of record in the file of this patent:

UNITED STATES PATENTS

| Number | Name | Date |
| --- | --- | --- |
| 977,580 | Abtmeyer | Dec. 6, 1910 |
| 1,107,285 | Gercich et al. | Aug. 18, 1914 |
| 1,119,573 | Byrum | Dec. 1, 1914 |
| 1,200,630 | Lightfoot | Oct. 10, 1916 |
| 1,359,889 | Gumaer | Nov. 23, 1920 |
| 1,426,433 | Wiley | Aug. 22, 1922 |
| 1,669,802 | Armstrong | May 15, 1928 |
| 1,751,219 | Seamon | Mar. 18, 1930 |
| 1,815,312 | Heise | July 21, 1931 |
| 1,817,118 | Adami | Aug. 4, 1931 |
| 1,821,232 | Noble | Sept. 1, 1931 |
| 1,831,821 | Noble | Nov. 17, 1931 |
| 1,836,639 | Armstrong | Dec. 15, 1931 |
| 1,903,477 | Rolfson | Apr. 11, 1933 |
| 1,905,770 | Walker | Apr. 25, 1933 |
| 1,943,310 | Heise | Jan. 16, 1934 |
| 2,026,797 | Pierson | Jan. 7, 1936 |
| 2,029,573 | Knapp et al. | Feb. 4, 1936 |
| 2,258,489 | Grindle | Oct. 7, 1941 |
| 2,295,304 | Stoddard et al. | Sept. 8, 1942 |
| 2,300,405 | Cook | Nov. 3, 1942 |
| 2,300,837 | Ames | Nov. 3, 1942 |
| 2,397,478 | Drechsler et al. | Apr. 2, 1946 |
| 2,408,295 | Cossin | Sept. 24, 1946 |

FOREIGN PATENTS

| Number | Country | Date |
| --- | --- | --- |
| 416,106 | Great Britain | Sept. 13, 1934 |
| 418,452 | Great Britain | Oct. 25, 1934 |
| 511,445 | Great Britain | Aug. 18, 1939 |